(12) United States Patent
Campbell et al.

(10) Patent No.: US 7,869,043 B2
(45) Date of Patent: Jan. 11, 2011

(54) AUTOMATED PASSIVE SKIN DETECTION SYSTEM THROUGH SPECTRAL MEASUREMENT

(75) Inventors: Matthew B. Campbell, Annandale, VA (US); Jeffrey E. Thoma, Vienna, VA (US); Andrew J. Dally, Chantily, VA (US); Merrick J. DeWitt, Vienna, VA (US); Troy A. Crites, Rockville, MD (US)

(73) Assignee: Sparta, Inc., Arlington, VA (US)

( * ) Notice: Subject to any disclaimer, the term of this patent is extended or adjusted under 35 U.S.C. 154(b) by 1042 days.

(21) Appl. No.: 11/649,793

(22) Filed: Jan. 5, 2007

(65) Prior Publication Data

US 2008/0188758 A1  Aug. 7, 2008

Related U.S. Application Data

(60) Provisional application No. 60/756,581, filed on Jan. 6, 2006.

(51) Int. Cl.
*G01N 21/25* (2006.01)

(52) U.S. Cl. ............... 356/419; 356/4.01; 356/404; 356/432; 382/118

(58) Field of Classification Search ........... 356/4.01, 356/9–10, 404, 406, 419, 600, 601; 382/118
See application file for complete search history.

(56) References Cited

U.S. PATENT DOCUMENTS

| | | | |
|---|---|---|---|
| 6,018,587 A | 1/2000 | Cabib | |
| 6,343,141 B1 | 1/2002 | Okada et al. | |
| 6,535,632 B1 | 3/2003 | Park et al. | |
| 6,670,963 B2 | 12/2003 | Osberger | |
| 6,697,502 B2 | 2/2004 | Luo | |
| 6,897,426 B2 | 5/2005 | Etienne-Cummings et al. | |
| 2002/0044674 A1* | 4/2002 | Pavlidis | 382/118 |
| 2003/0184748 A1* | 10/2003 | McCarthy | 356/328 |
| 2007/0024946 A1* | 2/2007 | Panasyuk et al. | 359/253 |

* cited by examiner

*Primary Examiner*—Tarifur Chowdhury
*Assistant Examiner*—Tara S Pajoohi
(74) *Attorney, Agent, or Firm*—Diederiks & Whitelaw PLC

(57) ABSTRACT

A passive skin detection system includes a main body which houses a collection optics system having an image splitting device, a visible light filter mechanism having a plurality of narrow band filters and an image capture system. The image capture system stores visible light data as a plurality of digital images formed from a plurality of pixels. Each of the plurality of digital images is associated with visible light passed through a respective one of the plurality of narrow band filters. An image processing system, operatively connected to the image capture system, compares relative intensities of each of the plurality of digital images to identify one or more of the plurality of pixels having an absorption bandwidth indicating a presence of skin. The processing system determines whether a person, identified by his skin, is present in any of the images captured by the detection system.

31 Claims, 6 Drawing Sheets

AUTOMATED PASSIVE SKIN DETECTION SYSTEM THROUGH SPECTRAL MEASUREMENT

CROSS-REFERENCE TO RELATED APPLICATIONS

The present application claims the benefit of U.S. Provisional Patent Application Ser. No. 60/756,581 filed Jan. 6, 2006.

STATEMENT REGARDING FEDERALLY SPONSORED RESEARCH OR DEVELOPMENT

The United States Government has rights in this invention based on Contract/Grant No. FA8650-04-C-5217, Subcontract No. SC5217-02-01.

BACKGROUND OF THE INVENTION

1. Field of the Invention

The present invention pertains to the art of imaging and, more particularly, to an image collection and processing system that passively detects skin through spectral measurement of an acquired image.

2. Discussion of the Prior Art

There is a constant need, particularly in the military and security fields, for advanced technologies that provide increased situational awareness in a city, municipality or even a combat zone. Accurate information regarding the number and location of humans in a particular area is an essential component of situational awareness. Automatically detecting humans by passively detecting skin would be extremely beneficial to law enforcement personnel, soldiers and security officers. This knowledge would provide an enhanced picture of a particular area of interest or operating environment.

At present, several methods employing video surveillance technology are being developed to detect people and/or skin. Typically, these methods exploit either RGB color-matching or spatial object recognition methods to locate humans in a particular scene. Unfortunately, these methods are limited due to a susceptibility to false alarms. RGB or similar color-matching methods rely on low-spectral resolution color bands located in the visible portion of the spectrum and are unable to discriminate between skin and skin-like colored objects, such as can be found in many paints and dyes. In addition, RGB methods are unable to recognize highly pigmented skin.

Other systems, such as those that employ object recognition methods, rely on an ability to associate a shape of an object in a scene with an individual. One limitation associated with this method is that it is necessary for an individual in the scene to span an extended portion of the field-of-view in order to obtain accurate shape identification. In addition, shape matching methods are susceptible to false negatives, such as may occur if shapes found in a scene are not recognized. For example, shape matching methods cannot reliably detect two individuals walking arm-in-arm, or individuals carrying large objects.

It is well known that Hyper Spectral Imaging (HSI), which is defined as many tens or hundreds of narrow spectral bands in either the visible or infrared (IR) portion of the spectrum, is capable of adding significantly to information contained in an image as compared to conventional (three color wide band) imaging. In addition, numerous studies and patents have shown that HSI imaging can detect camouflage, crop variations, provide discrimination of various targets, and potentially identify carcinomas. Unfortunately, conventional HSI sensor systems are data transmission intensive, i.e. require data transmission rates to be several orders of magnitude higher than conventional video systems, and/or computationally intensive, i.e., require the processing of tens of thousands of pixels at many wavelengths simultaneously. Data transmission becomes a problem when processing the spectral image is separated from the data gathering, e.g., during use of an unmanned aerial vehicle, due to power or space limitations or simply due to the complexity of the data that must be processed. Even when located with the sensor, current data processing of all pixels in all bands requires teraflop class processing speeds.

In addition to the above, full HSI sensors are very complex. That is, full HSI sensors must gather data simultaneously in many HSI bands across multiple spatial dimensions. This level of complexity results in a significantly high unit cost. Solutions to this challenge have involved linear scanning arrays which are not well suited to rapidly image large areas, or staring systems which are unable to simultaneously process the hyper-spectral dimension and are thus not well suited to spectrally image moving scenes.

Based on the above, there exists a need for a low cost, effective imaging system that can accurately detect skin from visual images. More specifically, there exists a need for an imaging system that employs HSI technology and utilizes a very limited number of narrow bands that enables certain features in spectral images to be isolated to detect skin. An imaging system of this type would find a wide range of applications, such as military surveillance and reconnaissance systems, as well as facility security and related video tracking systems.

SUMMARY OF THE INVENTION

The present invention is directed to a passive skin detection system including a main body which houses a collection optics system having at least one image splitting device, a plurality of narrow band visible light filters and an image capture system. The image capture system stores visible light data as a plurality of digital images formed from a plurality of pixels. Each of the plurality of digital images is associated with visible light which has passed through a respective one of the plurality of narrow band filters.

The detection system further includes an image processing system operatively connected to the image capture system. The image processing system employs an algorithm that compares relative intensities of each of the plurality of digital images to identify whether one or more of the plurality of pixels possesses an absorption bandwidth indicating a presence of skin. That is, the processing system determines whether a person, as identified through his/her skin, is present in any of the images captured by the detection system.

In accordance with a preferred form of the invention, the plurality of narrow band filters are constituted by three filters centered around a first predetermined wavelength, while being separated one from another by a second predetermined wavelength. Preferably, the first predetermined wavelength is 577 nm±40 nm and the second predetermined wavelength is separated by approximately 30-50 nm. The first wavelength is associated with a property of skin relating to blood flow. More specifically, it has been determined that an absorption band associated with oxygenated hemoglobin exists centered at approximately 577 nm. The present invention preferably compares information from the three narrow bands to identify the absorption band.

In further accordance with the invention, the algorithm isolates the identified pixels in further applications to support "feature aided" tracking approaches to video surveillance systems. The detection system is preferably low-cost and compact so as to be used in a wide array of applications, including heads-up displays, fixed site security, vehicle patrol, low-altitude unmanned aerial vehicles and the like.

Additional objects, features and advantages of the present invention will become more readily apparent from the following detailed description of preferred embodiments when taken in conjunction with the drawings wherein like reference numerals refer to corresponding parts in the several views.

DETAILED DESCRIPTION OF PREFERRED EMBODIMENTS

Figure 1:
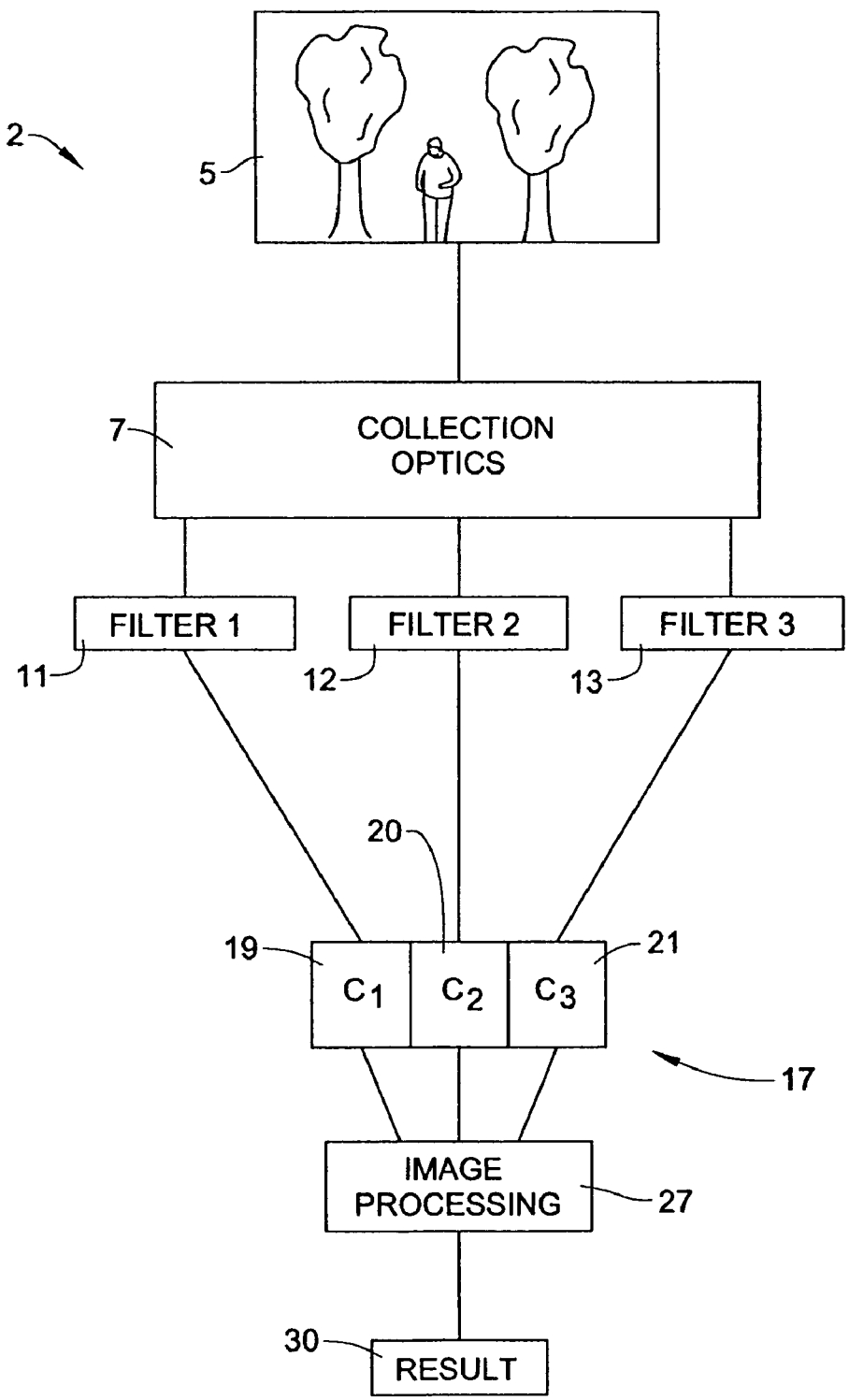
FIG. 1 is a block diagram schematically illustrating the passive skin detection system of the present invention.

With initial reference to FIG. 1, a passive skin detection system provided in accordance with the present invention is generally indicated at 2. As will become evident from the following detailed description of the invention, visible light beams representing an image 5 are received by a collection optics system 7 which splits and diverts the visible light through a plurality of narrow band filters 11-13. The visible light passing through filters 11-13 is projected onto an image capture system 17 having a plurality of image capture zones 19-21 which are preferably in the form of HSI sensors. Image capture zones 19-21 transform the visible light beams passing through respective ones of the plurality of narrow band filters 11-13 into a corresponding plurality of digital images which are passed onto an image processing system 27. Preferably, filters 11-13 are centered about a first wavelength, while also being separated one from another by a second wavelength. Most preferably, filters 11-13 are centered about 577 nm±20-40 nm and separated by approximately 30-50 nm. In addition, each filter 11-13 has a width of approximately 5-10 nm. Image processing system 27 utilizes an algorithm which produces a result 30 reflective of whether image 5 contains any indication of skin which would correlate to a human presence.

Figure 2:
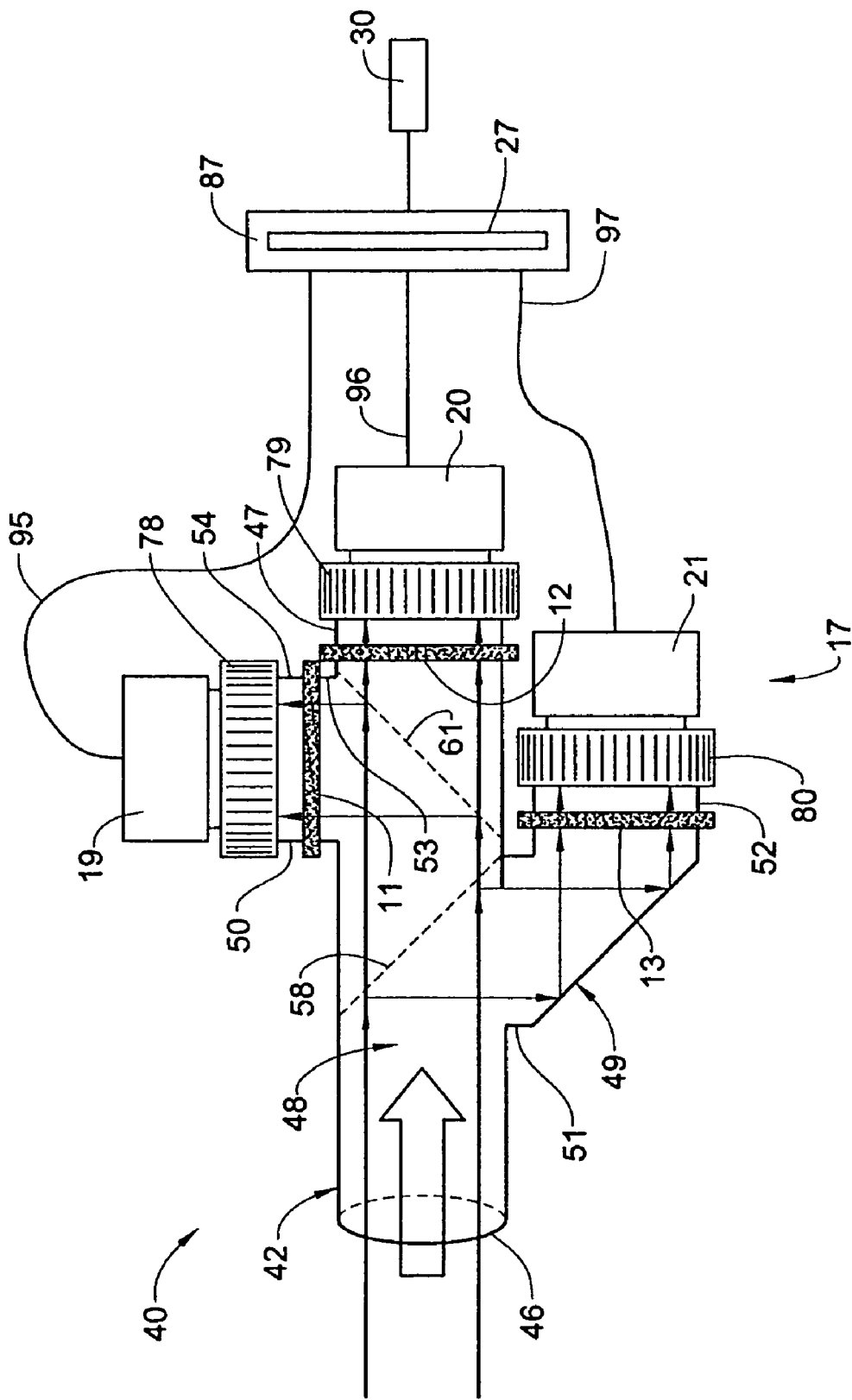
FIG. 2 is a top plan view of a common bore multiple image focusing device constructed in accordance with a first embodiment of the invention.

Reference will now be made to FIG. 2 in describing a first embodiment of the invention in which passive image detection system 2 is configured as a common bore, multiple image focusing device 40. Multiple image focusing device 40 includes a main housing 42 having a first end 46 which leads to a second end 47 through a hollow, interior portion 48. Main housing 42 further includes a first branch 49 and a second branch 50, each having corresponding first and second ends 51, 52 and 53, 54. Each second end 47, 52 and 54 provides support for a respective one of image capture zones 19-21. In accordance with the embodiment shown, filters 11-13 are located adjacent each image capture zone 19-21. With this arrangement, collection optics 7, shown in the form of a plurality of beam splitting elements 58 and 61, directs visible light through filters 11-13 onto image capture zones 19-21. More specifically, in addition to allowing visible light to pass directly through hollow interior portion 48 onto image capture zone 20, beam splitting elements or devices 58 and 61 guide the visible light onto image capturing devices 19 and 21. Towards that end, beam splitting element 58 allows a portion of the visible light to pass onto image capture device 20, while directing another portion of visible light into first branch 49 which is then projected onto image capture zone 21. Correspondingly, beam splitting device 61 allows a portion of the visible light to pass onto image capture device 20, while directing another portion of the visible light into second branch 50 which is then projected onto image capture zone 19.

Figure 3:
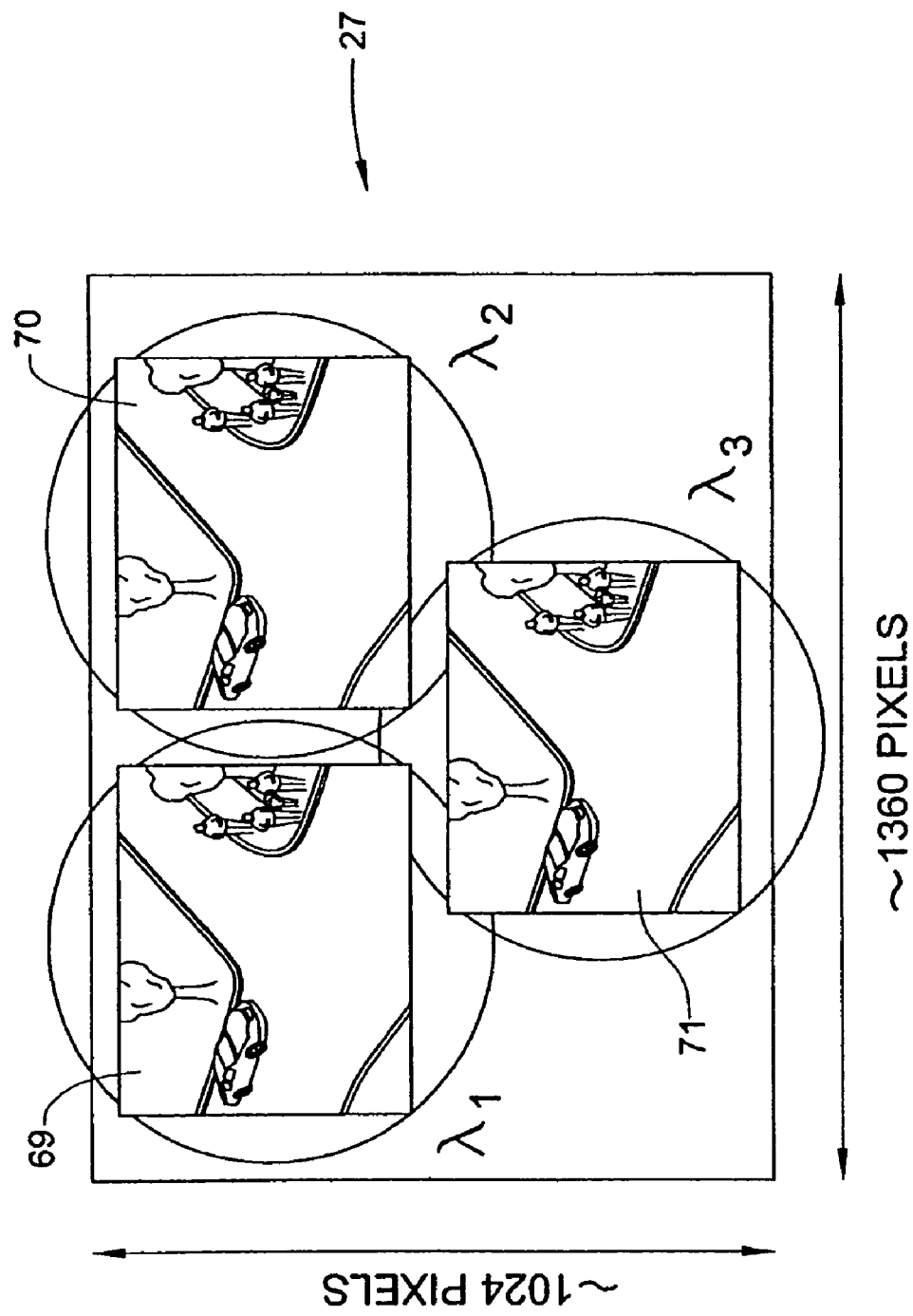
FIG. 3 illustrates three digital images collected by the passive skin detection system of FIG. 1.

With reference to both FIGS. 2 and 3, each image capture zone 19-21 transforms the visible light into a respective digital image 69, 70 and 71, each of which is formed from a plurality of pixels (FIG. 3). In order to ensure proper clarity of each digital image, each image capture zone 19-21 is provided with a corresponding focusing mechanism 78-80. Focusing mechanisms 78-80 can be adjusted manually or automatically to ensure proper clarity of each digital image 69-71. In any event, each digital image 69-71 from each image capture zone 19-21 is passed to a central control unit 87 through a corresponding communication link 95-97.

Figure 4:
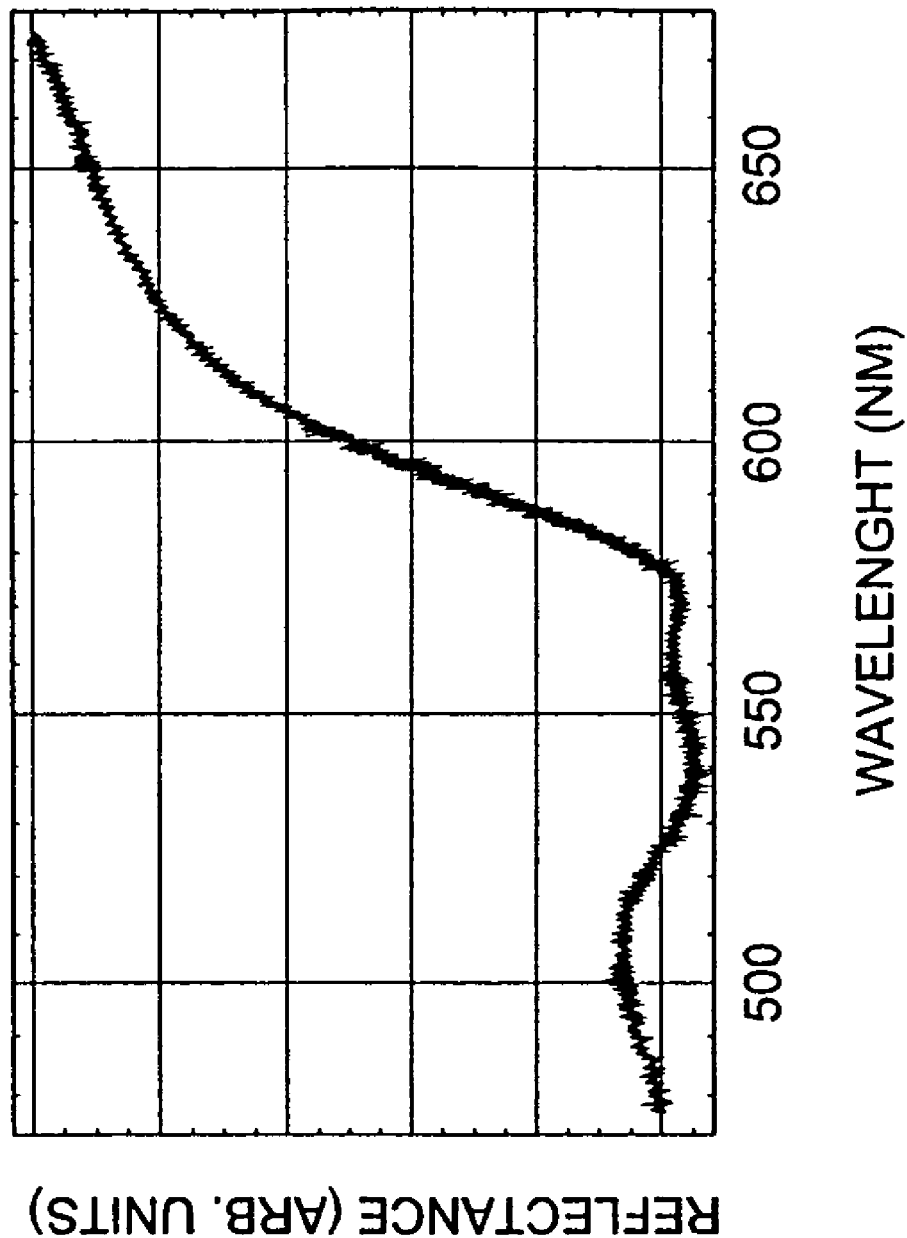
FIG. 4 is a graph illustrating a reflectance spectrum of human skin over a range extending between 470 and 670 nm.

In the most preferred form of the invention, central control unit 87 employs image processing system 27 which, in turn, employs a detection algorithm, as will be discussed more fully below, to produce result 30. In accordance with the invention, the detection algorithm compares relative intensities of visible light in each digital image 69-71. The detection algorithm compares the relative intensities of the images to isolate and identify any pixels that contain an indication of human skin. More specifically, the detection algorithm exploits a spectral feature found in all human skin, i.e., a response to visible light in a range of between approximately 450-700 nm and, most specifically an absorption band due to oxygenated hemoglobin centered at approximately 577 nm such as illustrated in FIG. 4. The detection algorithm is sensitive enough to reveal an indication of skin even if only found in a single one of the plurality of pixels. More specifically, the present invention can detect, on a single pixel level, whether any of digital images 69-71 contains visible light in the absorption band, thereby indicating the presence of skin.

Figure 5:
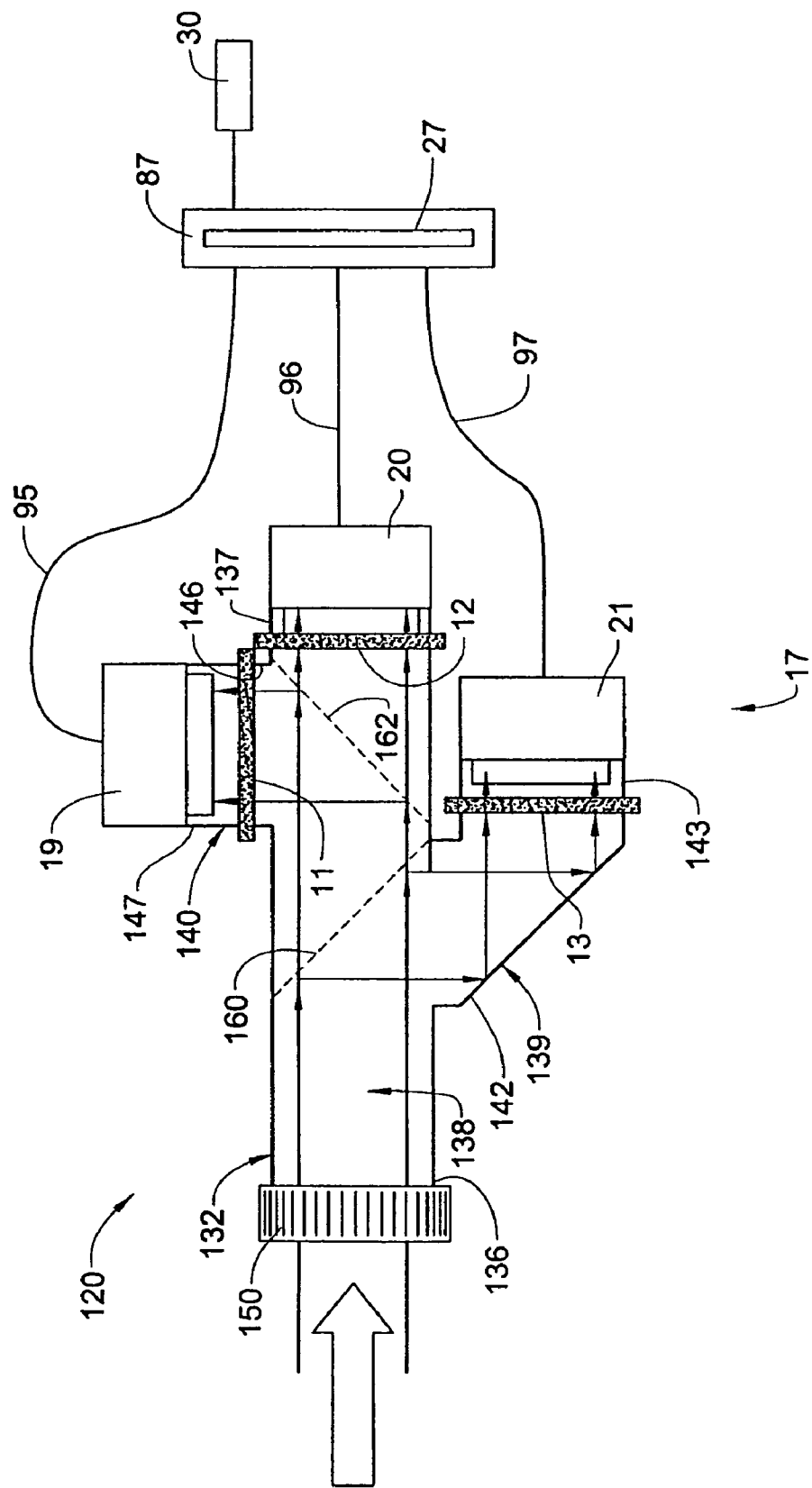
FIG. 5 is a top plan view of a common bore, single image focusing device employing the passive skin detection system constructed in accordance with a second embodiment of the present invention.

Reference will now be made to FIG. 5, wherein like reference numbers represent corresponding parts, in describing a second embodiment of the present invention which is constituted by a common bore single image focusing device 120. Single image focusing device 120 includes a main housing 132 having first and second ends 136 and 137 separated by a hollow interior portion 138. In a manner similar to that described above, main housing 132 includes first and second branches 139 and 140 each having corresponding first and second ends 142, 143 and 146, 147 respectively. In a manner also corresponding to that described above, each second end 137, 143 and 147 supports a respective one of image capture zones 19-21. However, unlike the first embodiment wherein each image capture zone includes a corresponding focusing mechanism, single image focusing device 120 includes a single focusing mechanism 150 provided at first end 136 of main housing 132. Focusing mechanism 150 can be adjusted manually or automatically to set image clarity on each image capture zone 19-21.

In accordance with the embodiment shown, visible light is passed through first end 136 of main housing 132 and focused by focusing mechanism 150. Portions of the visible light are redirected by collection optics 7, constituted by a pair of beam splitters 160 and 162, into first and second branches 139 and 140. That is, in a manner similar to that described above, one portion of the visible light passes directly onto first image capture zone 20, while another portion is redirected by first and second beam splitters 160 and 162 into first and second branches 139 and 140 onto corresponding image capture zones 19 and 21. Each image capture zone 19-21 captures digital images 69-71 formed from a plurality of pixels which are then passed to central control 87 and processed by processing system 27. As discussed above, processing system 27 employs the detection algorithm to produce result 30 indicating whether skin is present within any of the captured images.

Figure 6:
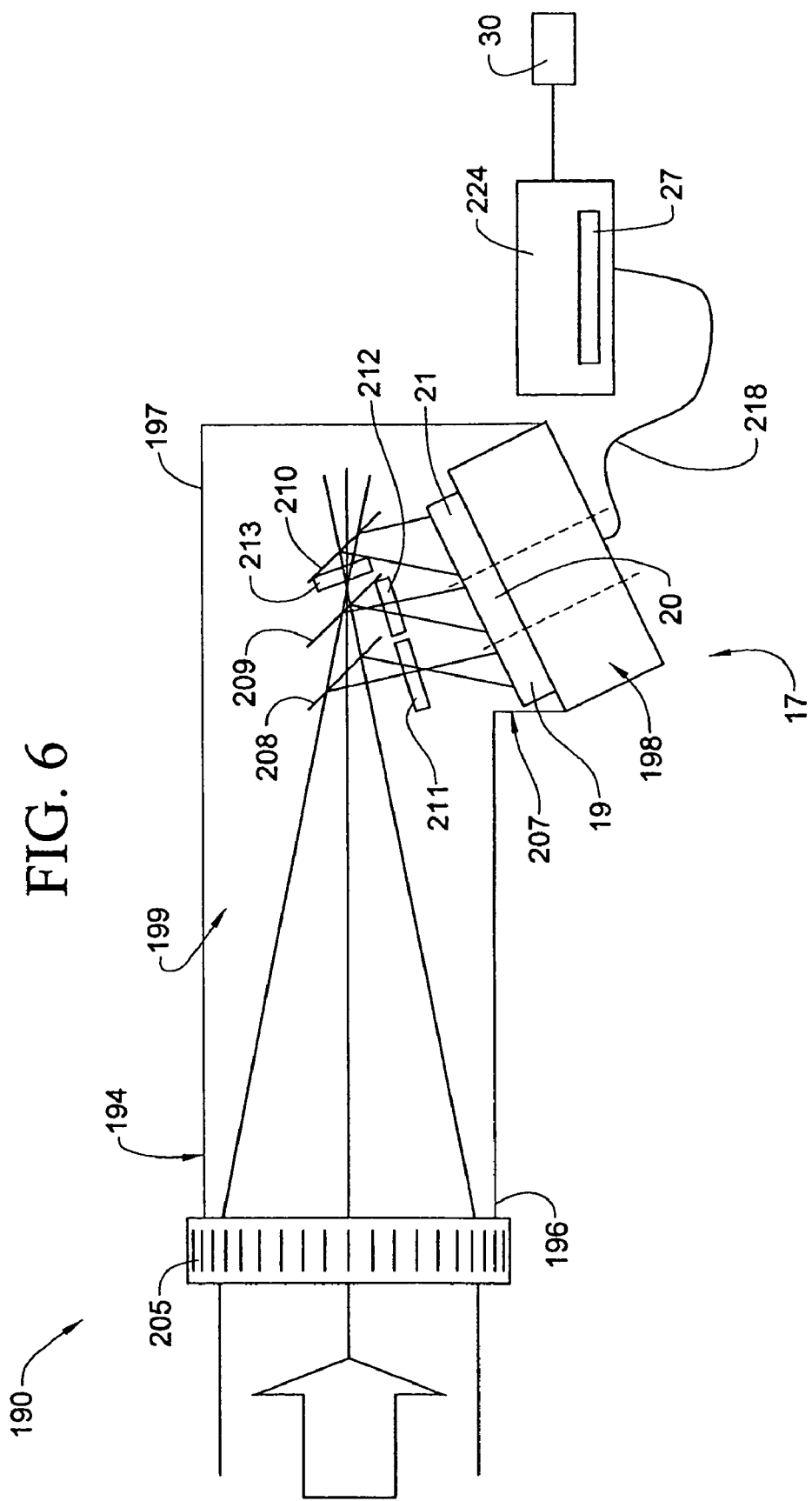
FIG. 6 is a top plan view of a common bore single image focusing device having an integrated image capture system divided into a plurality of image capture zones constructed in accordance with a third embodiment of the present invention.

Reference will now be made to FIG. 6 in describing a third embodiment of the present invention which is defined by a common bore, single image focusing device 190 with an image capture system 17 constituted by an integrated image capture unit 198 separated into image capture zones 19-21 as will be discussed more fully below. As shown, single image focusing device 190 includes a main housing 194 having a first end 196 that leads to a second end 197 through a hollow interior portion 199. In a manner similar to that described with respect to main housing 132, a focusing mechanism 205 is provided at first end 196 of main housing 194. However, unlike main housing 132, main housing 194 is provided with a single branch 207 which houses integrated image capture device 198. That is, visible light passing through focusing mechanism 205 is redirected through collection optics 7 constituted by three beam splitters 208-210 and then passed through corresponding narrow band filters 211-213 onto respective ones of image capture zones 19-21. At this point, it should be understood that filters 211-213 equate to filters 11-13. In any case, each image capture zone 19-21 transforms the visible light passing through narrow band filters 211-213 into digital is images 69-71 formed from a plurality of pixels. Digital images 69-71 are passed through a common communication link 218 to a central control 224. Central control 224 includes processing system 27 which utilizes the above described detection algorithm to produce result 30 indicating whether human skin is present within any one of the digital images captured by image capturing device 17.

At this point, it should be understood that the present invention establishes a simple apparatus for automated detection of human skin employing an HSI sensor system that is not computationally intensive, thereby reducing cost and complexity of the detection system. The system preferably has an effective range of 1-200 m and, most preferably, up to 5 km. In addition, the present invention can be employed as a simple, low cost solution to identify skin in a video image so as to be employed in military surveillance, reconnaissance, facility security and related video tracking systems. Moreover, the reduced complexity enables the system to be employed with unmanned aerial vehicles, heads-up displays, fix base security, vehicle patrol and the like.

Although described with reference to preferred embodiments of the invention, it should be readily understood that various changes and/or modifications can be made to the invention without departing from the spirit thereof. In general, the invention is only intended to be limited by the scope of the following claims.

We claim:

1. A passive skin detection system comprising:
   a main body defining a housing;
   a collection optics system arranged in the housing, said collection optics system including at least one beam splitting device;
   a plurality of narrow band filters, each of which is centered around a first predetermined wavelength, while also being separated one from another by a second predetermined wavelength;
   an image capture system including a plurality of image capture zones arranged in the housing, said image capture system storing visible light data as a plurality of digital images formed from a plurality of pixels, each of said plurality of digital images being associated with visible light passed through a respective one of the plurality of narrow band filters onto a corresponding image capture zone; and
   an image processing system operatively connected to the image capture system, said image processing system employing a detection algorithm that compares relative intensities of each of the plurality of digital images to identify one or more of the plurality of pixels having an absorption bandwidth indicating a presence of skin.

2. The passive skin detection system according to claim 1, further comprising: a plurality of image focusing devices associated with respective ones of the plurality of image capture zones.

3. The passive skin detection system according to claim 1, further comprising: a single focusing device associated with the plurality of image capture zones.

4. The passive skin detection system according to claim 1, wherein the plurality of narrow band filters is constituted by three narrow band filters.

5. The passive skin detection system according to claim 4, wherein each of the three narrow band filters has a bandwidth of approximately 5 -10 nm.

6. The passive skin detection system according to claim 4, wherein the first predetermined wavelength is between 537 and 617 nm.

7. The passive skin detection system according to claim 4, wherein the first predetermined wavelength is between 547 and 607 nm.

8. The passive skin detection system according to claim 7, wherein the first predetermined wavelength is approximately 577 nm.

9. The passive, skin detection system according to claim 4, wherein the second predetermined wavelength is between approximately 30 -50 nm.

10. The passive skin detection system according to claim 1, wherein the image capture system has a range of between 1 m and 200 m.

11. The passive skin detection system according to claim 1, wherein the image capture system has a range of 5 kilometers.

12. The passive skin detection system according to claim 1, wherein the image capture system is constituted by an integrated image capture device divided into a plurality of image capture zones.

13. A passive skin detection system comprising:
   a main body defining a housing;
   a collection optics system arranged in the housing, said collection optics system including at least one beam splitting device;
   a plurality of narrow band filters, each of which is centered around a first predetermined wavelength, while also being separated one from another by a second predetermined wavelength;

an image capture system including a plurality of image capture zones arranged in the housing, said image capture system storing visible light data as a plurality of digital images formed from a plurality of pixels, each of said plurality of digital images being associated with visible light passed through a respective one of the plurality of narrow band filters onto a corresponding image capture zone; and means for processing the plurality of digital images to identify one or more of the plurality of pixels having an absorption bandwidth indicating a presence of skin.

14. The passive skin detection system according to claim 13, further comprising: a plurality of image focusing devices associated with respective ones of the plurality of image capture zones.

15. The passive skin detection system according to claim 13, further comprising: a single focusing device associated with the plurality of image capture zones.

16. The passive skin detection system according to claim 13, wherein the plurality of narrow band filters is constituted by three narrow band filters.

17. The passive skin detection system according to claim 16, wherein each of the three narrow band filters has a bandwidth of approximately 5-10 nm.

18. The passive skin detection system according to claim 16, wherein the first predetermined wavelength is between 537 and 617 nm.

19. The passive skin detection system according to claim 16, wherein the first predetermined wavelength is between 547 and 607 nm.

20. The passive skin detection system according to claim 19, wherein the first predetermined wavelength is approximately 577 nm.

21. The passive skin detection system according to claim 16, wherein the second predetermined wavelength is between approximately 30-50 nm.

22. The passive skin detection system according to claim 13, wherein the image capture system has a range of between 1 m and 200 m.

23. The passive skin detection system according to claim 13, wherein the image capture system has a range of 5 kilometers.

24. The passive skin detection system according to claim 13, wherein the image capture system is constituted by an integrated image capture device divided into a plurality of image capture zones.

25. A method of passively detecting skin comprising:
collecting visible light through an optics system;
splitting the visible light into a plurality of visible light beams;
filtering each of the plurality of visible light beams through a respective one of a plurality of narrow band filters, each of the plurality of narrow band filters being centered about a first predetermined wavelength, while also being separated one from another by a second predetermined wavelength;
capturing the plurality of filtered visible light beams in the form visible light data;
storing the visible light data as a plurality of digital images formed from a plurality of pixels, each of said plurality of digital images being associated with visible light having passed through a respective one of the plurality of narrow band filters; and
comparing relative intensities of each of the plurality of digital images to identify one or more of the plurality of pixels having an absorption bandwidth indicating a presence of skin.

26. The method of claim 25, wherein the first predetermined wavelength is between 537 and 617 nm.

27. The method of claim 26, wherein the first predetermined wavelength is between 547 and 607 nm.

28. The method of claim 27, wherein the first predetermined wavelength is approximately 577 nm.

29. The method of claim 25, wherein the second predetermined wavelength is between approximately 30-50 nm.

30. The method of claim 25, further comprising: capturing the image from a range of between 1 m and 200 m.

31. The method of claim 30, wherein the image is captured from a range of 5 kilometers.

* * * * *